(No Model.)
E. J. HOWLAND.
Road Scraper, Grader and Leveler.
No. 231,581.  Patented Aug. 24, 1880.
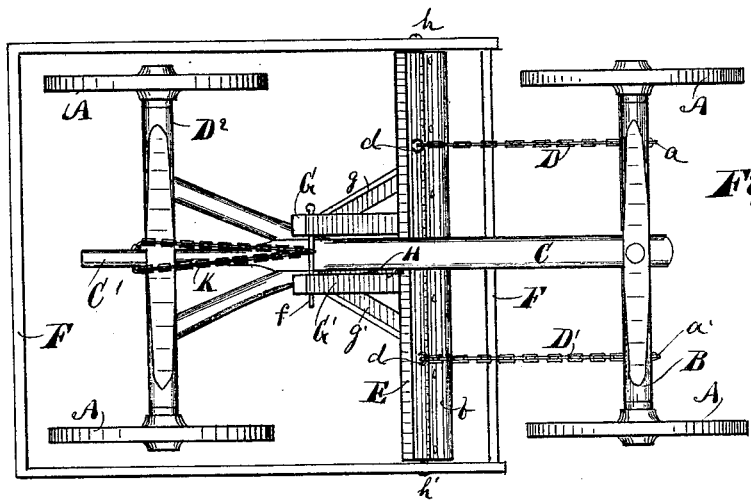
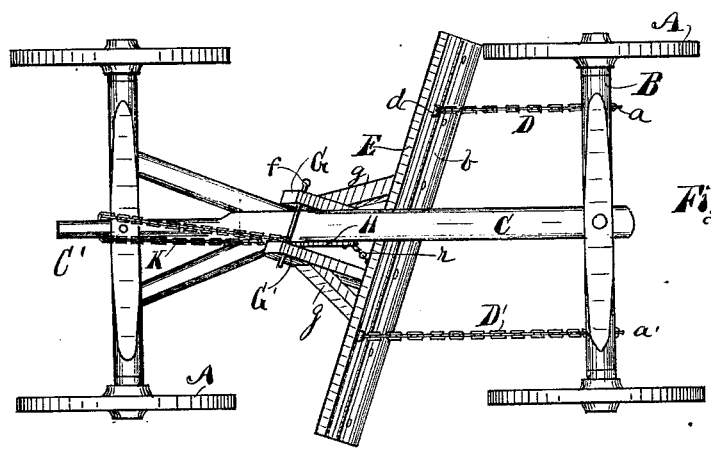
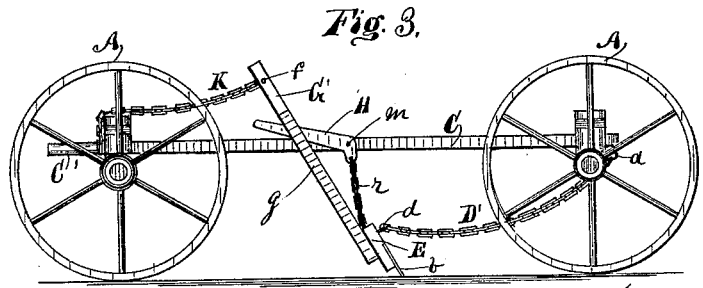
Witnesses:
G. H. Rennett
Zelora Phillips
Inventor.
Elisha J. Howland
per E. J. Frink
his attorney

UNITED STATES PATENT OFFICE.

ELISHA J. HOWLAND, OF INDIANAPOLIS, INDIANA.

ROAD SCRAPER, GRADER, AND LEVELER.

SPECIFICATION forming part of Letters Patent No. 231,581, dated August 24, 1880.

Application filed May 18, 1880. (No model.)

*To all whom it may concern:*

Be it known that I, ELISHA J. HOWLAND, of Indianapolis, in the county of Marion and State of Indiana, have invented a new and useful Road Scraper, Grader, and Leveler, of which the following is a specification.

My invention relates to improvements in road scrapers, graders, and levelers in which an adjustable scraper operates in conjunction with the running-gear of a wagon; and the objects of my invention are, first, to provide the running-gear of a wagon with an adjustable road scraper, grader, and leveler; second, to afford facilities for adjusting the scraper up or down at right angles to the line of motion or obliquely thereto; third, to provide a means for concentrating the draft of the scraper on the front axle; fourth, to afford facilities for leveling up a road or grading the same. These objects I attain by the mechanism illustrated in the accompanying drawings, in which—

Figure 1 represents a top or plan view of the entire machine, showing the scraper held by a drag-frame at right angles to the line of motion. Fig. 2 is a plan view, same as in Fig. 1, with the drag-frame removed and the scraper adjusted obliquely to the line of motion; and Fig. 3 is a side elevation, same as in Fig. 2, with the scraper adjusted at right angles to the line of motion.

Similar letters refer to similar parts throughout the several views.

A A represent the wheels, B $D^2$ the axles, and C the draft pole or reach, of any ordinary running-gear. To the draft-reach C is attached an L-shaped lever, H, by the pivot $m$, and in the front part of the front axle are secured two hooks, $a$ $a'$.

The scraper is composed of the lower bar, E, to the front side of which is securely bolted or fastened the scraper-iron $b$.

The uprights G G' are secured to the central portion of the scraper and strengthened by the angular braces $g$ $g'$. The upper end of each standard G G' is perforated with a hole, in which the pin $f$ is secured. The space between the standards G G' is larger than the width of the reach-bar C, to permit the scraper to be readily adjusted in an oblique direction, as shown in Fig. 2.

The lower end of the L-shaped lever H is provided with a chain, $r$, and the lower end of the chain $r$ is attached to the rear central portion of the scraper, as shown in Fig. 3. When the lever H is depressed the chain $r$ lifts the scraper E $b$ off of the ground, and the scraper is supported on the draft-reach C.

To the front of the scraper E, near each end, is secured an eyebolt or staple, $d$, to which the chains D D' are secured, the other ends of said chains being secured on the hooks $a$ $a'$ in the front axle. If these chains D D' are of equal length, then the scraper E is held at right angles to the line of motion, as in Figs. 1 and 3; but if one chain is coupled shorter than the other, then the scraper is held oblique, as in Fig. 2.

It will be observed that whatever position the scraper E occupies in relation to the line of draft, the draft is all concentrated on the front axle through the medium of the chains D D', and that the scraper may be readily raised or lowered by the lever H.

The rear chain, K, after passing around the rear projecting end, C', of the reach C, is brought forward, and the two ends secured by the pin $f$ to the upper end of the standards G G' of the scraper, thus preventing the scraper-standards G G' from being thrown forward, and also forming a means by which the scraper may be held at any required angle relative to the ground.

In Fig. 1 the drag-frame F is employed. This frame F is large enough to permit the hind wheels of the wagon to work inside thereof, and the frame extends forward some distance in front of the scraper E. The scraper E is securely bolted at each end to the sides of the frame, as shown at $h$ $h'$. The drag-frame prevents the scraper from falling between the line of the wheels, and is used for leveling up the ground, as follows, to wit: In running over rough ground the scraper scrapes up the dirt on the high places and deposits it in the low places.

Having thus described the construction and arrangement of the various parts of my invention, what I claim as new, and desire to secure by Letters Patent, is—

1. In combination with the running-gear of a wagon having a draft-reach provided with a lever, H, and its front axle provided with hooks $a\ a'$, the scraper E G G' and chains D, D', $r$, and K, substantially as described, for the purpose specified.

2. In combination with the running-gear of a wagon having a draft-reach provided with a lever, H, and its front axle provided with hooks $a\ a'$, the scraper E G G', the chains D, D', $r$, and K, and the drag-frame F, substantially as described, for the purpose specified.

In testimony whereof I have signed my name to this specification in the presence of two subscribing witnesses.

ELISHA J. HOWLAND.

Witnesses:
E. O. FRINK,
G. H. RENNETT.